United States Patent
Kasamatsu et al.

(10) Patent No.: US 8,404,377 B2
(45) Date of Patent: Mar. 26, 2013

(54) SEPARATOR FOR USE IN NON-AQUEOUS ELECTROLYTE SECONDARY BATTERY AND NON-AQUEOUS ELECTROLYTE SECONDARY BATTERY

(75) Inventors: Shinji Kasamatsu, Osaka (JP); Mikinari Shimada, Osaka (JP); Yasunori Nishida, Ibaraki (JP)

(73) Assignee: Panasonic Corporation, Osaka (JP)

( * ) Notice: Subject to any disclaimer, the term of this patent is extended or adjusted under 35 U.S.C. 154(b) by 893 days.

(21) Appl. No.: 12/091,666

(22) PCT Filed: Apr. 20, 2007

(86) PCT No.: PCT/JP2007/058613
§ 371 (c)(1),
(2), (4) Date: Apr. 25, 2008

(87) PCT Pub. No.: WO2007/125827
PCT Pub. Date: Nov. 8, 2007

(65) Prior Publication Data
US 2009/0148762 A1    Jun. 11, 2009

(30) Foreign Application Priority Data
Apr. 28, 2006 (JP) .................................. 2006-126211

(51) Int. Cl.
*H01M 2/14* (2006.01)
(52) U.S. Cl. ........................................................ 429/145
(58) Field of Classification Search .................... 429/145
See application file for complete search history.

(56) References Cited

U.S. PATENT DOCUMENTS

| 2002/0055036 A1* | 5/2002 | Shinohara et al. ............. 429/62 |
| 2005/0214637 A1 | 9/2005 | Imachi et al. |
| 2006/0019154 A1* | 1/2006 | Imachi et al. ................. 429/144 |

FOREIGN PATENT DOCUMENTS

| CN | 1340868 A | 3/2002 |
| CN | 1677715 A | 10/2005 |
| EP | 1 768 209 A1 | 3/2007 |
| JP | 3175730 | 7/1991 |
| JP | 2000-30686 | 1/2000 |
| JP | 2000-100408 | 4/2000 |
| JP | 2002-141042 | 5/2002 |
| JP | 2003-040999 | 2/2003 |
| JP | 2003-242954 | 8/2003 |

(Continued)

OTHER PUBLICATIONS

Japanese Issuance of Communication issued in Japanese Patent Application No. JP 2006-126211 dated May 26, 2010.

(Continued)

*Primary Examiner* — Karie O'Neill Apicella
(74) *Attorney, Agent, or Firm* — McDermott Will & Emery LLP

(57) ABSTRACT

A separator for use in a non-aqueous electrolyte secondary battery including a first porous layer (layer A) having a shutdown function which becomes substantially a non-porous layer at a high temperature, and a second porous layer (layer B) including an aramid resin and an inorganic material, wherein a ratio ($T_A/T_B$) of a thickness ($T_A$) of the layer A relative to a thickness ($T_B$) of the layer B is 2.5 or more and 13 or less.

7 Claims, 2 Drawing Sheets

FOREIGN PATENT DOCUMENTS

| | | |
|---|---|---|
| JP | 2004-349146 | 12/2004 |
| JP | 2004-363048 | 12/2004 |
| JP | 2005-302634 | 10/2005 |
| JP | 2006-059733 | 3/2006 |
| JP | 2006-164873 | 6/2006 |
| JP | 2006-318893 | 11/2006 |
| WO | WO 2006/064775 A1 | 6/2006 |
| WO | WO 2006/112266 A1 | 10/2006 |

OTHER PUBLICATIONS

Chinese Office Action issued in Chinese Patent Application No. CN 200780001406.X dated Jan. 29, 2010.

Chinese Office Action issued in Chinese Application No. 200780001406 X, dated Aug. 21, 2009.

* cited by examiner

F I G. 2
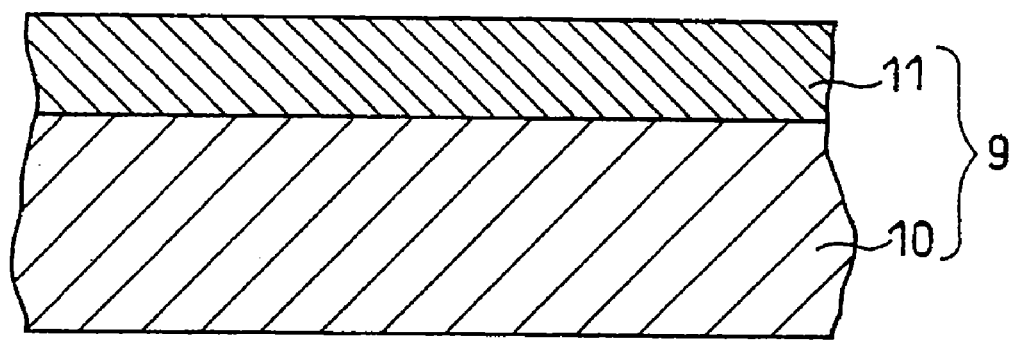

SEPARATOR FOR USE IN NON-AQUEOUS ELECTROLYTE SECONDARY BATTERY AND NON-AQUEOUS ELECTROLYTE SECONDARY BATTERY

RELATED APPLICATIONS

This application is the U.S. National Phase under 35 U.S.C. §371 of International Application No. PCT/JP2007/058613, filed on Apr. 20, 2007, which in turn claims the benefit of Japanese Patent Application No. JP 2006-126211, filed on Apr. 28, 2006, the disclosures of which Applications are incorporated by reference herein.

TECHNICAL FIELD

The present invention relates to a separator for use in a non-aqueous electrolyte secondary battery and a non-aqueous electrolyte secondary battery, and specifically relates to a separator capable of providing non-aqueous electrolyte secondary batteries excellent in safety and output performance and a non-aqueous electrolyte secondary battery including the same.

BACKGROUND ART

The non-aqueous electrolyte secondary batteries, having a high capacity and a high energy density as compared with the conventional secondary batteries, are actively used for small-size electronic equipment, such as portable phones and notebook personal computers.

The non-aqueous electrolyte secondary batteries include a non-aqueous electrolyte, a positive electrode, and a negative electrode. The non-aqueous electrolyte generally comprises a non-aqueous solvent and a lithium salt dissolved therein. The positive electrode includes a positive electrode active material and a positive electrode current collector carrying the same. For the positive electrode active material, a material capable of reversibly absorbing and desorbing lithium ions and exhibiting a stable potential is preferably used. The negative electrode includes a negative electrode active material and a negative electrode current collector carrying the same. For the negative electrode active material, a material capable of reversibly absorbing and desorbing lithium ions and exhibiting a stable potential is preferably used. The positive electrode and the negative electrode have, for example, a sheet-like shape or a strip-like shape.

Between the positive electrode and the negative electrode, a separator made of an insulative porous material is interposed. An electrode assembly is fabricated, for example, by winding the positive electrode and the negative electrode with the separator interposed therebetween or stacking the positive electrode and the negative electrode with the separator interposed therebetween. The electrode assembly is housed together with the non-aqueous electrolyte, in a battery case of various shapes (a prismatic shape, a cylindrical shape, etc.), whereby a non-aqueous electrolyte secondary battery is fabricated.

In recent years, reduction in size and weight of electronic equipment has been advanced rapidly. Under such circumstances, the non-aqueous electrolyte secondary batteries to be used as a power source have been required to be further smaller in size and have a higher output than ever before. Accordingly, in light of improving the housing efficiency of the electrode assembly in the battery case, the reduction in thickness of the separator has been required.

Moreover, since the battery temperature rises when the positive electrode and the negative electrode are short-circuited, providing the separator with a function capable of ensuring safety is also required. The heat resistance of the separator is strongly dependent on its material. In view of this point, study has been made about a separator formed by stacking a layer made of an aramid resin excellent in heat resistance and a porous layer having a shutdown function, and other separators. The shutdown function is a function to cause melting when the battery generates heat, to close the pores, and block the migration of lithium ions. The porous layer having the shutdown function becomes a substantially non-porous layer at high temperatures.

Further, in view of maintaining the output performance of non-aqueous electrolyte secondary batteries, it is also important to ensure the lithium ion permeability of the separator.

As described above, the separator for use in a non-aqueous electrolyte secondary battery is required to satisfy a reduction in thickness, an ensured permeability of lithium ions, a function capable of ensuring safety at high temperatures, and the like.

Meanwhile, in recent years, a separator including an aramid resin, which is a heat resistant resin, has been actively developed.

For example, one proposal suggests a separator having a heat resistant layer including both a nitrogen-containing aromatic polymer, which is a heat resistant resin, and a ceramics powder. The heat resistant layer is disposed on the surface of a base material made of fibers, non-woven fabric, paper or porous film. The weight per unit area of the suggested base material is 40 g/m² or less, and the thickness of the base material is 70 µm or less (see Patent Document 1). Patent Document 1 discloses a porous film made of polyethylene as an example of the base material.

Another proposal suggests forming an aramid resin film on the surface of a separator having the shutdown function (see Patent Document 2). Patent Document 2 discloses a separator comprising a porous film made of polyethylene (thickness: 16 µm) and an aramid resin film (thickness: 5 µm).

Patent Document 1: Japanese Patent Publication No. 3175730
Patent Document 2: Japanese Laid-Open Patent Publication No.

DISCLOSURE OF THE INVENTION

Problem To be Solved by the Invention

The proposals of Patent Documents 1 and 2 are useful in that an excellent safety can be ensured by providing the separator with the shutdown function and heat resistance. However, there is no specific disclosure about correlation among the reduction in thickness, the lithium ion permeability, and the safety.

Based on the foregoing, the present invention intends to provide a separator that is thin and excellent in durability without impairing the safety, and is capable of preventing a reduction in the output performance of non-aqueous electrolyte secondary batteries. Furthermore, the present invention intends to provide a non-aqueous electrolyte secondary battery which is excellent in output performance and also excellent in safety, and is capable of size reduction by way of optimization of the structure of the separator.

Means for Solving the Problem

The present invention relates to a separator for use in a non-aqueous electrolyte secondary battery including a first porous layer (layer A) having a shutdown function which becomes substantially a non-porous layer at a high temperature, and a second porous layer (layer B) including an aramid resin and an inorganic material, the layer A and the layer B being laminated together, wherein a ratio ($T_A/T_B$) of a thickness ($T_A$) of the layer A relative to a thickness ($T_B$) of the layer B is 2.5 or more and 13 or less.

The present invention further relates to a non-aqueous electrolyte secondary battery comprising a positive electrode capable of reversibly absorbing and desorbing lithium ions, a negative electrode capable of reversibly absorbing and desorbing lithium ions, a separator interposed between the positive electrode and the negative electrode, and a non-aqueous electrolyte, wherein the separator is the foregoing separator for use in a non-aqueous electrolyte secondary battery.

Effect of the Invention

According to the present invention, a separator that is thin but excellent in durability, and is capable of preventing a reduction in the output performance of batteries as well as ensuring the safety of the batteries can be provided. According to the present invention, a non-aqueous electrolyte secondary battery capable of size reduction, and excellent in output performance and also excellent in safety can be provided.

BRIEF DESCRIPTION OF THE DRAWINGS

FIG. 2 A partial cross sectional view of a separator for use in a non-aqueous electrolyte secondary battery of the present invention.

BEST MODE FOR CARRYING OUT THE INVENTION

Figure 1:
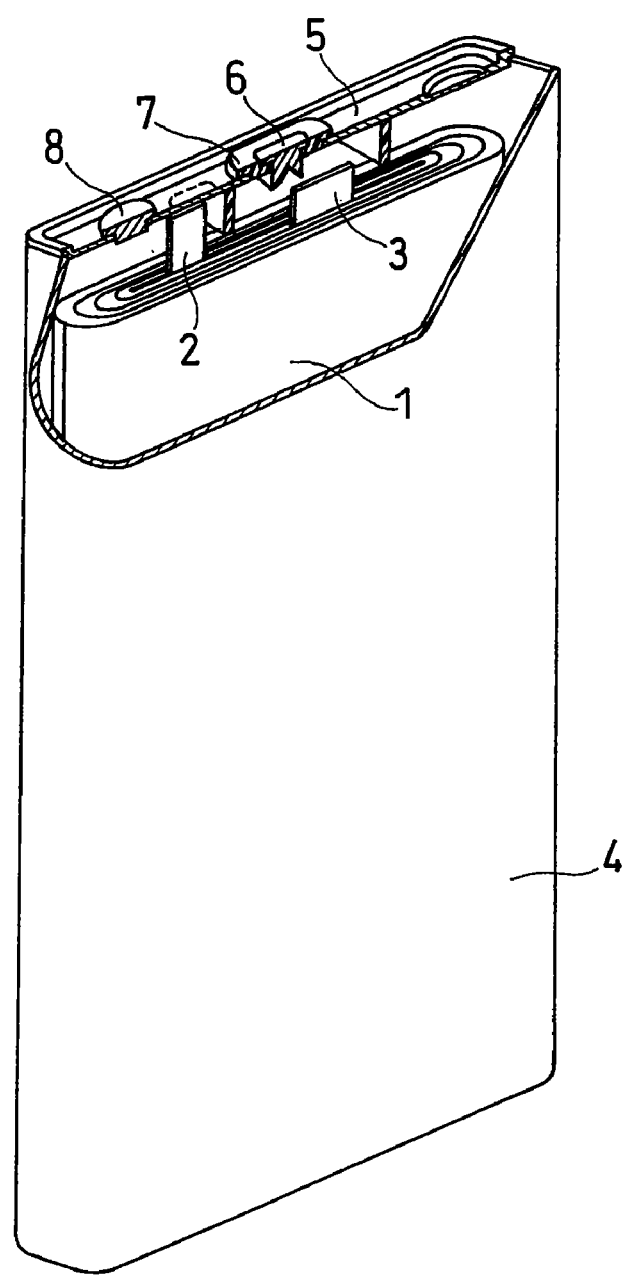
FIG. 1 A partly cut-away perspective view of one example of a non-aqueous electrolyte secondary battery of the present invention.

A separator for use in a non-aqueous electrolyte secondary battery of the present invention includes a first porous layer (layer A) having a shutdown function which becomes substantially a non-porous layer at a high temperature, and a second porous layer (layer B) including an aramid resin and an inorganic material. By stacking the porous layer (layer A) having a shutdown effect, and the porous layer (layer B) including an aramid resin and an inorganic material that are excellent in heat resistance, a separator having an excellent reliability including heat resistance can be obtained.

A ratio ($T_A/T_B$) of a thickness ($T_A$) of the layer A relative to a thickness ($T_B$) of the layer B is preferably 2.5 or more and 13 or less, and more preferably 3 or more and 8 or less. By optimizing $T_A/T_B$, the thickness of the separator can be reduced, the lithium ion permeability can be ensured, and the excellent output performance can be maintained. As a result, an electrode assembly comprising a positive electrode, a negative electrode and the separator can be efficiently housed in a small-size battery case. A non-aqueous electrolyte secondary battery having a high capacity can be thus obtained.

The layer A is preferably a porous layer made of a thermoplastic resin. In this case, it is preferable that the layer A becomes a substantially non-porous layer at a temperature of 80° C. or more and 180° C. or less and preferably at a temperature of 110 to 140° C. The layer A as described above has an excellent shutdown function. It should be noted that the substantially non-porous layer has a Gurley value (air permeability) of 5000 sec/100 mL or more. It is preferable that the porous layer made of a thermoplastic resin is, for example, a porous layer made of a polyethylene-based resin having a melting point of 110 to 140° C. By using polyethylene as the thermoplastic resin, a separator excellent in reliability and stability can be obtained.

A total ($T_A+T_B$) of the thickness of the layer A and the thickness of the layer B is preferably 11 μm or more and 22 μm or less, and more preferably 14 to 20 μm. In general, an increase in thickness of the separator results in an improvement in reliability, such as safety. However, in light of the general structure of an electrode assembly of non-aqueous electrolyte secondary batteries, in which a positive electrode and a negative electrode are wound with a separator interposed therebetween, an excessive increase in thickness of the separator results in an increase in volume of the electrode assembly, which reduces the housing efficiency to a battery case. Moreover, an excessive increase in thickness of the layer B may reduce the cycle performance. By adjusting $T_A+T_B$ to 11 to 22 μm, the housing efficiency of the electrode assembly can be maintained at a high level and favorable charge/discharge cycle and output performances can be obtained.

A content of the aramid resin included in the layer B is preferably 20 wt % or more and 45 wt % or less, and more preferably 20 to 40 wt %. An increase in the content of the aramid resin results in an improvement in the heat resistance of the separator. However, an excessive increase in the content of the aramid resin results in a reduction of lithium ion permeability in the layer B, which increases the resistance to the migration of lithium ions and reduces the output performance. On the other hand, a reduction in the content of the aramid resin results in an improvement in the output performance. However, an excessive reduction in the content of the aramid resin results in a reduction of the heat resistance and mechanical strength of the separator. By adjusting the content of the aramid resin included in the layer B to 20 to 45 wt %, a separator excellent in heat resistance can be obtained without causing a reduction in the lithium ion permeability in the layer B.

A porosity of the layer A is preferably 37% or more and 48% or less, and more preferably 39 to 47%. When the porosity is less than 37%, there may be a possibility that the lithium ion permeability in the layer A is reduced, and the output performance is reduced. On the other hand, when the porosity exceeds 48%, the mechanical strength of the separator is reduced, and the pores in the layer A are partially deformed easily. Consequently, there may be a possibility that the permeability of lithium ions becomes uneven, and the cycle performance may be reduced. There may be another possibility when the porosity exceeds 48% that the shutdown function is degraded, and the reliability of non-aqueous electrolyte secondary batteries is reduced. By adjusting the porosity of the layer A to be 37 to 48%, a highly reliable non-aqueous electrolyte secondary battery having an excellent safety, in which the output performance is maintained, can be obtained.

The separator for use in a non-aqueous electrolyte secondary battery of the present invention has preferably an air permeability of 150 sec/100 mL or more and 400 sec/100 mL or less, and more preferably 160 to 350 sec/100 mL. When the separator has such air permeability, it is easy to maintain the lithium ion permeability in the separator and ensure the reliability, such as heat resistance.

The separator for use in a non-aqueous electrolyte secondary battery of the present invention has a piercing strength of preferably 250 gf or more, and more preferably 300 gf or more. The separator having a piercing strength of 250 gf or more, in particular, has high mechanical strength and is excellent in reliability.

The present invention involves a non-aqueous electrolyte secondary battery including the foregoing separator. The non-aqueous electrolyte secondary battery including the foregoing separator is excellent in output performance and excellent in reliability, such as safety, and is suitable for size reduction.

The non-aqueous electrolyte secondary battery of the resent invention includes a non-aqueous electrolyte, a positive electrode, a negative electrode, and the foregoing separator. The positive electrode and the negative electrode have, for example, a sheet-like shape or a strip-like shape. A wound-type electrode assembly is fabricated, for example, by winding the sheet-like positive electrode and negative electrode with the separator interposed therebetween. Alternatively, a stacked-type electrode assembly is fabricated, for example, by stacking the sheet-like positive electrode and negative electrode with the separator interposed therebetween. The electrode assembly is housed together with the non-aqueous electrolyte, in a battery case of various shapes (a prismatic shape, a cylindrical shape, etc.), whereby a non-aqueous electrolyte secondary battery is fabricated.

A method for fabricating a non-aqueous electrolyte secondary battery is described below by referring to the drawings. It is to be noted that the present invention is not limited to the content of the drawings.

FIG. 1 is a partly cut-away perspective view of a prismatic non-aqueous electrolyte secondary battery according to one embodiment of the present invention. The non-aqueous electrolyte secondary battery has an electrode assembly 1 formed by winding a positive electrode and a negative electrode with a separator interposed therebetween. The electrode assembly 1 is housed with a non-aqueous electrolyte (not shown) in a prismatic battery case 4. In the upper portion of the battery assembly 1, a frame (not shown) made of a resin for separating the electrode assembly 1 from a sealing plate 5 as well as for preventing the contact between a positive electrode lead 2 or a negative electrode lead 3 and the battery case 4 is disposed. The sealing plate 5 is provided with an outer negative electrode terminal 6 and an injection port for non-aqueous electrolyte. The injection port is closed with a sealing plug 8. The positive electrode lead 2 is connected to the back face of the sealing plate 5 and the negative electrode lead 3 is connected to the outer negative electrode terminal 6. The outer negative electrode terminal 6 is insulated from the sealing plate 5 by the gasket 7.

Next, with respect to one example of the separator for use in a non-aqueous electrolyte secondary battery of the present invention, its structure and production method are described.

FIG. 2 is a partial cross sectional view of a separator for use in a non-aqueous electrolyte secondary battery. A separator 9 has a first porous layer 10 (layer A) having a shutdown function which becomes substantially a non-porous layer at a high temperature, and a second porous layer 11 (layer B) including an aramid resin and an inorganic material disposed on the surface of the layer A 10. Here, a ratio ($T_A/T_B$) of a thickness ($T_A$) of the layer A 10 relative to a thickness ($T_B$) of the layer B 11 is set to 2.5 or more and or less.

It is preferable that the layer A preferably becomes a substantially non-porous layer at a temperature of 80° C. or more and 180° C. or less. The layer A is preferably made of a thermoplastic resin, and for example, preferably made of a polyolefin-based resin.

Examples of olefins constituting the polyolefin-based resin include ethylene, propylene, butene, and hexene. The polyolefin-based resin is specifically exemplified by a polyethylene-based resin, such as a low density polyethylene, a linear polyethylene (an ethylene-a-olefin copolymer), and a high density polyethylene; a polypropylene-based resin, such as polypropylene, and an ethylene-propylene copolymer; and a copolymer of poly(4-methyl-pentene-1), poly(butene-1) and an ethylene-vinyl acetate copolymer.

Among the polyolefins, particularly, a polyethylene-based resin is preferably used. When the polyethylene-based resin is used, the content of the polyethylene-based resin in the thermoplastic resin is preferably 60 wt % or more and 100 wt % or less.

The layer A may include an additive as needed as long as the shutdown function is not impaired. Examples of the additive include an organic or inorganic filler used for the purpose of reinforcement, and a nonionic surfactant. A preferred amount of the filler to be included in the layer A is, for example, 15 to 85 parts by volume per 100 parts by volume of the thermoplastic resin (per 100 parts by weight of the thermoplastic resin, for example, 40 to 230 parts by weight).

For example, in order to enhance the thermal stability and processablity, a stretching aid, a stabilizer, an antioxidant, an UV-ray absorber, a flame retardant, a nonionic surfactant, and the like may be added to the layer A made of polyolefin. For example, a fatty acid ester, a polyolefin resin having a low molecular weight, and the like are used as the additive. A preferred amount of the additive to be included in the layer A is 1 wt % or less.

For the inorganic filler to be included in the layer A, various inorganic materials having an electric insulation property may be used. For example, calcium carbonate, magnesium carbonate, barium carbonate, talc, clay, mica, kaolin, silica, hydrotalcite, diatomite, calcium sulfate, magnesium sulfate, barium sulfate, aluminum hydroxide, magnesium hydroxide, calcium oxide, magnesium oxide, titanium oxide, alumina, zinc oxide, zeolite, a grass powder, and the like are preferred. In particular, calcium carbonate, hydrotalcite, barium sulfate, magnesium hydroxide, alumina, and the like are preferred in view of easiness in obtaining the material having a fine particle size and their low water content. These may be used singly or in combination of two or more.

Examples of the organic filler to be included in the layer A include, for example, particles or fibers of a homopolymer or a copolymer of vinyl monomer; and particles or fibers of a polycondensation resin, such as a melamine resin or a urea resin. These may be used singly or in combination of two or more. Examples of the vinyl monomer include, for example, styrene, vinyl ketone, acrylonitrile, methyl methacrylate, ethyl methacrylate, glycidyl methacrylate, glycidyl acrylate, and methyl acrylate.

The layer B includes an aramid resin and an inorganic material.

Examples of the aramid resin include, for example, a para-orientation aromatic polyamide (hereinafter referred to as "para-aramid"), and a meta-orientation aromatic polyamide (hereinafter referred to as "meta-aramid"). In particular, a para-aramid is preferred, in view of its mechanical strength and its susceptibility to become porous. The para-aramid is prepared, for example, by means of condensation polymerization of an aromatic diamine having amino groups in para-position and an aromatic dicarboxylic acid halide having acyl groups in para-position. Accordingly, in the para-aramid, an amido bond is present in the para-position of the aromatic ring or a similar position thereto. The para-aramid has, for example, a repetition unit of a 4,4'-biphenylene group, a 1,5-naphthalene group, a 2,6-naphthalene group, and the like.

The para-aramid is specifically exemplified by poly(paraphenylene terephthalamide), poly(para-benzamide), poly(4,4'-benzanilide terephthalamide), poly(paraphenylene-4,4'-biphenylene dicarboxylic acid amide), poly(paraphenylene-2,6-naphthalene dicarboxylic acid amide), poly(2- chloroparaphenylene terephthalamide), a paraphenylene terephthalamide/2,6-dichloro paraphenylene terephthalamide copolymer, and the like. These may be used singly or in combination of two or more.

For the inorganic material, alumina, silica, titanium dioxide, zirconium oxide, and the like are preferred. These may be used singly or in combination of two or more. A preferred mean particle size of the inorganic material is, for example, 0.01 to 1 μm.

The amount of the inorganic material to be included in the layer B is, per 100 parts by weight of aramid resin, preferably 120 to 400 parts by weight and particularly preferably 150 to 300 parts by weight.

In order to obtain a porous structure, a pore-forming agent may be used in the fabrication of the layer A and the layer B. For the pore-forming agent, the one that can be removed by washing with water after the raw material sheet of the layer A or the layer B is stretched is preferred. The pore-forming agent is preferably water soluble so that it can be removed with a neutral, acidic or alkaline aqueous solution.

One exemplary method for fabricating the layer A and the layer B is described below.

(i) First Porous Layer (Layer A)

Polyethylene, a filler, necessary additives (for example, a nonionic surfactant), and the like are mixed using conventional mixing apparatus, such as a biaxial kneader, a twin roller, a Banbury mixer, a Henschel mixer, or a uniaxial extruder. The resultant mixture is formed into a sheet having a desired thickness by means of a conventional film forming method, such as inflation molding, calendering, or T-die extrusion molding. The resultant sheet is stretched preferably by uniaxial or biaxial stretching.

(ii) Second Porous Layer (Layer B)

The para-aramid resin is soluble to a polar organic solvent. The para-aramid resin is dissolved into a solvent to prepare a low-viscous para-aramid solution suitable for application. Next, the resultant resin solution is mixed with an inorganic material to prepare a raw material slurry of layer B.

It is preferable that the viscosity of the raw material slurry of layer B is controlled to a viscosity suitable for application to the surface of the layer A. The intrinsic viscosity of the para-aramid resin in the layer B is, for example, preferably 1.0 dL/g to 2.8 dL/g, and more preferably 1.7 dL/g to 2.5 dL/g. When the intrinsic viscosity is less than 1.0 dL/g, a layer B having a sufficient strength may not be obtained. On the other hand, when the intrinsic viscosity exceeds 2.8 dL/g, the para-aramid solution becomes unstable, and it may be difficult to form a film.

In the present invention, the intrinsic viscosity of para-aramid is measured in the following manner. Firstly, 0.5 g of para-aramid resin is dissolved into 100 mL of concentrated sulfuric acid having a concentration of 96 to 98 wt %, to prepare a mixture solution of para-aramid resin and concentrated sulfuric acid. With respect to the resultant mixture solution, and the concentrated sulfuric acid having a concentration of 96 to 98 wt %, the flow time at 30° C. is measured using an Ubbelohde capillary viscometer. From the ratio between the determined flow times, the intrinsic viscosity is determined by the following formula.

$$\text{Intrinsic viscosity} = \ln(T/T_0)/C \text{ [unit: dL/g]}$$

Here, T is a flow time of the mixture solution of para-aramid resin and concentrated sulfuric acid, $T_0$ is a flow time of concentrated sulfuric acid having a concentration of 96 to 98 wt %, and C is a concentration (g/dL) of the para-aramid resin in the mixture solution of para-aramid resin and concentrated sulfuric acid.

The polar organic solvent into which the para-aramid resin is to be dissolved is exemplified by a polar amide-based solvent or a polar urea-based solvent, and specifically exemplified by N,N-dimethyl formaldehyde, N,N-dimethylacetamide, N-methyl-2-pyrrolidone, tetramethyl urea, and the like, but not limited thereto. These may be used singly or in combination of two or more.

The raw material slurry of layer B is applied to the surface of the layer A in a desired thickness. In this process, the inorganic material is entwined with the aramid resin, and the inorganic material is dispersed evenly in the aramid resin. The content of the aramid resin included in the raw material slurry relative to the total of the aramid resin and the inorganic material is preferably 20 wt % or more and 45 wt % or less, and more preferably 30 wt % or more and 40 wt % or less. When the content of the aramid resin exceeds 45 wt %, the lithium ion permeability in the layer B may be reduced.

This may result in a case where a necessary battery output performance cannot be obtained. When the content of the aramid resin is less than 20 wt %, the strength of the layer B may be reduced.

The positive electrode includes a positive electrode active material and a positive electrode current collector carrying the same. The sheet-like positive electrode comprises a band-like positive electrode current collector and a positive electrode material mixture layer carried on both faces thereof. For the positive electrode active material, a material capable of reversibly absorbing and desorbing lithium ions and exhibiting a stable potential is preferably used.

For the positive electrode current collector, a metallic foil made of aluminum (Al) etc, a carbon thin film, a conductive resin thin film, and the like may be used. The positive electrode current collector may be provided with surface treatment with carbon, and the like.

The positive electrode material mixture layer includes the positive electrode active material as an essential component. For the positive electrode active material, for example, a lithium-containing composite oxide such as $LiCoO_2$, $LiNiO_2$, $Li_2MnO_4$, and $LiMn_2O_4$ is used. The transition metals in these lithium-containing composite oxides may be partially substituted with other elements. Alternatively, olivine-type lithium phosphate represented by the general formula: $LiMPO_4$ (M=V, Fe, Ni, or Mn), lithium fluorophosphate represented by the general formula: $Li_2 MPO_4F$ (M=V, Fe, Ni, or Mn) may be used. The positive electrode active material may be provided with surface treatment with a metal oxide, a lithium oxide, a conductive agent, etc., and the surface thereof may be made hydrophobic. The positive electrode active material may be used singly or in combination of two or more.

The positive electrode material mixture layer may include various optional components. For example, the positive electrode material mixture layer includes a conductive agent and a positive electrode binder.

For the conductive agent, it is possible to use various natural graphites and various artificial graphites; carbon blacks, such as acetylene black, Ketjen Black, channel black, furnace black, lamp black and thermal black; conductive fibers, such as carbon fiber and metal fiber; carbon fluoride; metal powders, such as aluminum powder; conductive whiskers, such as zinc oxide whisker and potassium titanate whisker; conductive metal oxides, such as titanium oxide; and organic conductive materials, such as a phenylene derivative; and the like. These may be used singly or in combination of two or more.

For the positive electrode binder, it is possible to use polyvinylidene fluoride (PVDF), modified PVDF, polytetrafluoroethylene, polyethylene, polypropylene, an aramid resin, polyamide, polyimide, polyamide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyeter, polyethersulfone, hexafluoropolypropylene, styrene butadiene rubber (SBR), modified SBR, carboxymethylcellulose (CMC), and the like. Alternatively, a copolymer of two or more selected from tetrafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid, hexadiene, and the like may be used. The positive electrode binder may be used singly or in combination of two or more.

The negative electrode includes a negative electrode active material and a negative electrode current collector carrying the same. For example, the sheet-like negative electrode comprises a band-like negative electrode current collector and a negative electrode material mixture layer carried on both faces thereof. For the negative electrode active material, a material capable of reversibly absorbing and desorbing lithium ions and exhibiting a stable potential is preferably used.

For the negative electrode current collector, a metal foil made of stainless steel, nickel, copper, titanium, etc., a carbon thin film, a conductive resin thin film, and the like may be used. The negative electrode current collector may be provided with surface treatment with carbon, nickel, titanium, and the like.

The negative electrode material mixture layer includes the negative electrode active material as an essential component. For the negative electrode active material, it is possible to use various natural graphites and various artificial graphites; silicon-based composite materials (silicide etc.); lithium alloys including at least one selected from tin, aluminum, zinc, magnesium, etc.; various alloy materials capable of reacting with lithium; and the like.

The negative electrode material mixture layer may include various optional components. For example, for a negative electrode binder, it is possible to use the ones as exemplified above as the positive electrode binder by selecting as needed. In particular, in view of improving the battery safety in the event of overcharge, modified SBR is preferably used for the negative electrode binder. The SBR and the modified SBR are preferably used in combination with a cellulose-based resin, such as carboxymethylcellulose (CMC).

The non-aqueous electrolyte preferably comprises a non-aqueous solvent and a lithium salt dissolved therein. Materials for the non-aqueous electrolyte are selected in light of the oxidation reduction potentials, and the like of the active material.

Examples of a preferred lithium salt include $LiPF_6$, $LiBF_4$, $LiClO_4$, $LiAlCl_4$, $LiSbF_6$, $LiSCN$, $LiCF_3SO_3$, $LiN(CF_3CO_2)$, $LiN(CF_3SO_2)_2$, $LiAsF_6$, $LiBloCl_{10}$, lithium lower aliphatic carboxylate, $LiF$, $LiCl$, $LiBr$, $LiI$, $LiBCl_4$, lithium bis(1,2-benzendioleate (2-)-O,O') borate, lithium bis(2,3-naphthalenedioleate (2-)-O,O') borate, lithium bis(2,2'-biphenyldioleate (2-)-O,O') borate, lithium bis(5-fluoro-2-oleate-1-benzenesulfonate-O,O') borate, $(CF_3SO_2)_2NLi$, $LiN(CF_3SO_2)(C_4F_9SO_2)$, $(C_2F_5SO_2)_2NLi$, lithium tetraphenylborate, and the like. These may be used singly or in combination of two or more.

For the non-aqueous solvent into which the lithium salt is to be dissolved, it is possible to use ethylene carbonate (EC), propylene carbonate (PC), butylene carbonate (BC), dimethyl carbonate (DMC), diethyl carbonate (DEC), ethyl methyl carbonate (EMC), dipropyl carbonate (DPC), methyl formate, methyl acetate, methyl propionate, ethyl propanoate, dimethoxymethane, γ-butyrolactone, γ-valerolactone, 1,2-diethoxyethane, 1,2-dimethoxyethane, ethoxymethoxyethane, trimethoxymethane, tetrahydrofuran, a tetrahydrofuran derivative such as 2-methyltetrahydrofuran, dimethylsulfoxide, 1,3-dioxolane, a dioxolane derivative such as 4-methyl-1,3-dioxolane, formamide, acetamide, dimethylformamide, acetonitrile, propylnitrile, nitromethane, ethyl monoglyme, phosphoric acid triester, acetic acid ester, propionic acid ester, sulfolane, 3-methylsulfolane, 1,3-dimethyl-2-imidazolidinone, 3-methyl-2-oxazolidinone, a propylene carbonate derivative, ethyl ether, diethyl ether, 1,3-propanesultone, anisole, fluorobenzene, and the like. These may be used singly or in combination of two or more.

The non-aqueous electrolyte may further include an additive, such as vinylene carbonate (VC), cyclohexylbenzene, biphenyl, diphenyl ether, vinylethylene carbonate (VEC), divinylethylene carbonate, phenylethylene carbonate, diallyl carbonate, fluoroethylene carbonate, catechol carbonate, vinyl acetate, ethylene sulfite, propane sultone, trifluoropropylene carbonate, dibenzofuran, 2,4-difluoroanisole, O-terphenyl, m-terphenyl. These may be used singly or in combination of two or more.

An immobilized polymer electrolyte obtained by allowing the non-aqueous electrolyte to be retained in a polymer is also applicable. For the polymer in which the non-aqueous electrolyte is allowed to be retained, it is possible to use polyethylene oxide, polypropylene oxide, polyphosphazene, polyaziridine, polyethylene sulfide, polyvinyl alcohol, polyvinylidene fluoride, polyhexafluoropropylene, and the like. These may be used singly or in combination of two or more.

Alternatively, an inorganic material may be used as a solid electrolyte. Examples of the inorganic material include a lithium nitride, a lithium halide, a lithium oxyacid salt, $Li_4SiO_4$, $Li_4SiO_4$—$LiI$—$LiOH$, $Li_3PO_4$—$Li_4SiO_4$, $Li_2SiS_3$, $Li_3PO_4$—$Li_2S$—$SiS_2$, and a phosphorus sulfide compound.

The present invention is described below in detail with reference to Examples. It is to be noted that the present invention is not to be limited to the following Examples.

EXAMPLES (i) Fabrication of Positive Electrode

An aqueous solution containing cobalt sulfate at a concentration of 0.20 mol/L and containing nickel sulfate at a concentration of 0.80 mol/L was supplied continuously into a reaction bath. Into the reaction bath, sodium hydroxide was dropped until the pH of the aqueous solution reached 10 to 13, whereby $Ni_{0.80}Co_{0.20}(OH)_2$ was synthesized. Thereafter, this hydroxide was washed with water sufficiently, and then dried, to yield a precursor of positive electrode active material. The resultant precursor was mixed with lithium carbonate such that the molar ratio among lithium, nickel and cobalt became 1.02:0.80:0.20. The resultant mixture was pre-baked at 600° C. for 10 hours, and then pulverized. The pulverized baked material was baked again at 900° C. for 10 hours, and then pulverized and classified, whereby a lithium-containing composite oxide represented by the formula: $Li_{1.02}Ni_{0.80}Co_{0.20}O_2$ was obtained.

A positive electrode material mixture paste was obtained by mixing 1 kg of positive electrode active material (mean particle size: 12 μm) made of the resultant lithium-containing composite oxide with 0.5 kg of #1320 (an N-methyl-2-pyrrolidone (NMP) solution containing 12 wt % of PVDF) available from Kureha Chemical Industry Co., Ltd., 40 g of acetylene black, and an appropriate amount of NMP with the use of a double-arm kneader at 30° C. for 30 minutes.

The resultant positive electrode material mixture paste was applied onto both faces of a 20-μm-thick aluminum foil serving as a positive electrode current collector, and then dried at 120° C. for 15 minutes. Thereafter, the positive electrode current collector with the positive electrode material mixture carried thereon was rolled until the total thickness reached 160 μm. The electrode plate thus obtained was cut into a width that could be inserted into a prismatic battery case having a height of 50 mm, a width of 34 mm, and a thickness of 5 mm, whereby a positive electrode was obtained. To the positive electrode, a predetermined positive electrode lead was connected.

(ii) Fabrication of Negative Electrode

A negative electrode material mixture paste was produced by mixing 3 kg of artificial graphite, 200 g of BM-400B (an aqueous dispersion containing 40 wt % of modified styrene-butadiene rubber) available from Zeon corporation, 50 g of carboxymethylcellulose (CMC), and an appropriate amount of water with a double-arm kneader.

The resultant negative electrode material mixture paste was applied onto both faces of a 12-μm-thick copper foil serving as a negative electrode current collector, and then dried. Thereafter, the negative electrode current collector with the negative electrode material mixture carried thereon was rolled until the total thickness reached 160 μm. The electrode plate thus obtained was cut into a width that could be inserted into the prismatic battery case having a height of 50 mm, a width of 34 mm, and a thickness of 5 mm, whereby a negative electrode was obtained. To the negative electrode, a predetermined negative electrode lead was connected.

(iii) Fabrication of Separator (Fabrication of Layer A)

100 parts by weight of ultra-high molecular weight polyethylene resin (weight average molecular weight: 3,000,000; melting point: 136° C.), which is a thermoplastic resin, 44 parts by weight of olefin-based wax powder (weight average molecular weight: 1,000; melting point: 110° C.), which is a thermoplastic resin, and 256 parts by weight of calcium carbonate (mean particle size: 0.20 μm) were mixed with a Henschel mixer. Thereafter, the mixture was kneaded with a biaxial kneader, to yield a polyolefin-based resin compound.

The resultant polyolefin-based resin compound was rolled with rollers to be formed into a sheet. Subsequently, the polyethylene sheet (PE sheet) thus obtained was immersed in a bath with an aqueous hydrochloric acid solution to dissolve and remove calcium carbonate. Thereafter, the PE sheet was washed with water and dried. The dried PE sheet was stretched with a tenter stretching machine, whereby a porous polyethylene film (layer A) was obtained.

The roller temperature at the time of rolling with rollers and the thickness after rolling of the polyolefin-based resin compound were set within a range of 149° C. to 152° C. and a range of 70 μm to 80 μm, respectively, and further, the temperature at the time of the tenter stretching was set within a range of 100° C. to 11⁰° C. Under these conditions, various layers A having a thickness, a porosity, an air permeability, and a piercing strength as shown in Tables 1A, 2A, 3A, 4A and 5A were obtained.

In this process, two pieces of samples of the layer A were obtained by cutting into a square whose length of each side was 10 cm. One sample was placed in a constant temperature room at 80° C., and the other sample was placed in a constant temperature room at 180° C., for one minute each. Thereafter, the Gurley value was measured. No significant change was observed in the Gurley value of the sample placed in the constant temperature room at 80° C. In contrast, the Gurley value of the sample placed in the constant temperature room at 180° C. was changed to 5000 (sec/100 mL) or more. It was confirmed from these results that the layer A becomes substantially non-porous at 80 to 180° C.

(Fabrication of Layer B)

After 272.65 g of calcium chloride was dissolved into 4200 g of NMP, 132.91 g of paraphenylendiamine was added thereto and completely dissolved. To the solution thus obtained, 243.32 g of terephthalic acid dichloride (hereinafter referred to as TPC) was gradually added to form para-aramid by polymerization, and further diluted with NMP to obtain a para-aramid solution having a concentration of 2.0 wt %. Here, from the resultant para-aramid solution, para-aramid resin was separated, and the intrinsic viscosity thereof was determined. The intrinsic viscosity was 2.01 dL/g.

To the resultant para-aramid solution, an alumina powder (mean particle size: 0.16 μm) was added and dispersed, to prepare various raw material slurries of layer B having different contents of aramid resin. Here, the content of aramid rein relative to the total of the aramid resin and the alumina powder was varied to 16 wt %, 20 wt %, 33 wt %, 45 wt % or 50 wt %.

Subsequently, a predetermined amount of the raw material slurry of layer B was applied on one face of the polyethylene film (layer A), and then aramid resin was deposited in an atmosphere having a temperature of 60° C. and a humidity of 70%. Thereafter, the deposited aramid resin was washed with water and dried. As a result, a separator comprising the layer A and the layer B formed on one face of the layer A, in which the layer B includes the aramid resin and the alumina powder was obtained.

By using the raw material slurries of layer B having different contents of aramid resin, and adjusting the applied amount to the layer A, various layers B having an aramid contents and thicknesses as shown in Tables 1A, 2A, 3A, 4A and 5A were formed, and thus various separators were obtained.

(iv) Fabrication of Battery

The positive electrode, the negative electrode and the separator fabricated as described above were used to fabricate a prismatic non-aqueous electrolyte secondary battery as shown in FIG. 1.

First, the negative electrode and the positive electrode were wound with the separator 9 interposed therebetween, to form the electrode assembly 1 having a roughly elliptic cross section. Here, 30 pieces of electrode assembly 1 were fabricated for each type of separator. Next, the sealing plate 5 and the positive electrode lead 2 were electrically connected, and then the outer negative electrode terminal 6, which was disposed on the sealing plate 5 such that it was enclosed by a gasket 7, and the negative electrode lead 3 were electrically connected. The sealing plate 5 and the opening end of the battery case 4 were then welded together. Thereafter, a non-aqueous electrolyte obtained by dissolving $LiPF_6$ at a concentration of 1 mol/L into a mixture solvent including ethylene carbonate and propylene carbonate in a volume ratio of 1:1, was injected from the injection port disposed in the sealing plate 5. Finally, a sealing plug 8 was inserted into the injection port and closed the injection port by welding. In such a manner as described above, a prismatic battery having a height of 50 mm, a width of 34 mm, and a thickness of 5 mm was fabricated. The design capacity of the battery was set to 1000 mAh.

(v) Evaluation

With respect to the separators and the prismatic non-aqueous electrolyte secondary batteries fabricated in the manner as described above, the following evaluations were performed.

(Evaluation of Separator)
(1) Thickness of Layer A and Layer B

The thickness was measured in accordance with a method specified in JIS Standard K7130-1992.

(2) Porosity of Layer A

The layer A was cut into a square whose length of each side was 10 cm, and the weigh W (g) and the thickness T (cm) were measured. Next, the value of an absolute specific gravity D ($g/cm^3$) of the layer A was used to determine a porosity (%) by the following formula:

Porosity (%)=100×{1−(W/D)/(100×T)}

(3) Air Permeability

The Gurley value (sec/100 mL) of the separator was measured in accordance with a method specified in JIS Standard P8117, with a use of a B-type densometer (available from Toyo Seiki Seisaku-sho, LTD.)

(4) Piercing Strength

The separator was fixed with a Ø12 mm washer. The fixed separator was pierced with a pin at a rate of 200 mm/min, and the maximum stress (gf) at this time was determined as a piercing strength. As for the shape of the pin, the pin diameter was Ø1 mm and the tip had a curvature of 0.5 R.

(Evaluation of Battery)
(1) Initial Capacity

Before subjected to the following evaluations, the fabricated batteries were placed in an environment at 20° C., and charged at a constant current of 0.1 C based on the design capacity, until 4.2 V was reached, and subsequently, charged at a constant current of 4.2 V for five hours. Thereafter, the batteries were discharged at a constant current of 0.1 C to measure an initial capacity ($C_0$) at room temperature.

On the basis of the initial capacity thus determined, evaluations were carried out in terms of a low-temperature rate performance, a cycle performance, a heating test, and a leakage failure were evaluated in the following manner.

(2) Low-temperature Rate Performance

The batteries were placed in an environment at 20° C., and charged at a constant current of 0.1 C based on the design capacity, until 4.2 V was reached, and subsequently, charged at a constant current of 4.2 V for five hours. Thereafter, the batteries in a charged state were left for 60 minutes in an environment of −10° C., and then discharged at a current of 1 C (1000 mA). The ratio of the discharge capacity thus obtained relative to the initial capacity ($C_0$) was determined as a capacity retention rate (%).

(3) Cycle Performance

The batteries were subjected to repeated charge and discharge at an environmental temperature of 20° C. under the following conditions.

First, the batteries were charged at a constant current of 1.0 A until the battery voltage reached 4.2 V, and subsequently, charged at a constant current of 4.2 V until the current value was reduced to 50 mA. The batteries after charge were allowed to stand for 30 minutes. Thereafter, the batteries were discharged at a current value of 0.2 A until the battery voltage was reduced to 3.0 V. The batteries after discharge were allowed to stand for 30 minutes. This charge and discharge was regarded as one cycle, and the charge/discharge cycle was repeated until the discharge capacity became 50% of the initial capacity ($C_0$). The number of cycles repeated was determined as a number of 50% maintained cycles.

(4) Heating Test

The batteries were placed in a heating bath, and the temperature of the heating bath was raised to 140° C. at a temperature elevation rate of 5° C./min. The batteries were left for 10 minutes in this state. Thereafter, the temperature of the battery was monitored to measure a maximum temperature that the battery temperature reached.

(5) Leakage Failure

When a direct-current voltage of 250 V was applied to the electrode assembly, if an amount of current of 10 mA or more passed therethrough, it was regarded as an occurrence of leakage cell. When there were three or more occurrences of leakage cell among 30 batteries, it was judged as an occurrence of leakage failure.

(vi) Evaluation results

[Evaluation 1]

Table 1B shows evaluation results obtained when the thickness of the separator was fixed at 16 μm, and the ratio of the thickness of layer A relative to the thickness of layer B was varied, as shown in Table 1A. It should be noted that the samples Nos. 1 to 3 were of Examples and the samples Nos. C1 and C2 were of Comparative Examples.

TABLE 1A

| | Separator | | | | | | | |
|---|---|---|---|---|---|---|---|---|
| Sample | $T_A$ (μm) | $T_B$ (μm) | $T_A/T_B$ | $T_A+T_B$ (μm) | Layer A Porosity (%) | Layer B Aramid content (wt %) | Air permeability (sec/100 mL) | Piercing strength (gf) |
| C1 | 10.7 | 5.3 | 2.0 | 16 | 42 | 33 | 390 | 290 |
| 1 | 11.4 | 4.6 | 2.5 | 16 | 42 | 33 | 360 | 310 |
| 2 | 13.0 | 3.0 | 4.3 | 16 | 42 | 33 | 300 | 350 |
| 3 | 14.1 | 1.9 | 7.5 | 16 | 42 | 33 | 250 | 380 |
| 4 | 14.86 | 1.14 | 13.0 | 16 | 42 | 33 | 220 | 400 |
| C2 | 14.9 | 1.1 | 13.5 | 16 | 42 | 33 | 220 | 400 |

TABLE 1B

| Sample | Low-temperature rate performance Capacity retention rate (%) | Cycle performance Number of 50% maintained cycles (cycles) | Heating test Maximum temperature (° C.) | Leakage failure (250 V applied) |
|---|---|---|---|---|
| C1 | 70 | 200 | 143 | Nil |
| 1 | 85 | 400 | 143 | Nil |
| 2 | 87 | 450 | 145 | Nil |
| 3 | 88 | 460 | 146 | Nil |
| 4 | 90 | 480 | 148 | Nil |
| C2 | 90 | 480 | 165 | Nil |

As shown in Tables 1A and 1B, in the case where the thickness of the separator was 16 μm, when the ratio of the thickness of layer A relative to the thickness of layer B was within a range of 2.5 or more and 13 or less, favorable results were obtained in terms of the low-temperature rate performance, the number of 50% maintained cycles, and the heating test. Moreover, no leakage failure was observed.

In the sample No. C1 (the ratio of the thickness of layer A relative to the thickness of layer B was 2.0), the low-temperature rate performance was low, the number of 50% maintained cycles was small. This is presumably because the lithium ion permeability was reduced due to the relatively large thickness of the layer B, and the resistance was increased.

In the sample No. C2 (the ratio of the thickness of layer A relative to the thickness of layer B was 13.5), the low-temperature rate performance and the number of 50% maintained cycles were at the same level as those of the sample No. 4. However, the maximum temperature of sample No. C4 in the heating test was as much as approximately 20° C. higher than those of the samples Nos. 1 to 4. This is presumably because the heat resistance was reduced due to the small thickness of the layer B.

[Evaluation 2]

Table 2B shows evaluation results obtained when the ratio of the thickness of layer A relative to the thickness of layer B was fixed at 4.3, and the total of the thickness of layer A and the thickness of layer B was varied, as shown in Table 1A.

was 4.3, and the content of the aramid resin included in the layer B was 33 wt %, in the samples Nos. 2, 5 and 6 in which the total of the thickness of layer A and the thickness of layer B was 11 to 22 μm, favorable results were obtained in terms of the low-temperature rate performance, the number of 50% maintained cycles, and the heating test. Moreover, no leakage failure was observed. However, the comparison among the samples Nos. 2, 5 and 6 revealed that there was a tendency that the low-temperature rate performance and the number of 50% maintained cycles were slightly reduced in association with the increase in the total of the thickness of layer A and the thickness of layer B. This was because the lithium ion permeability was reduced and the resistance was increased in association with the increase in the thickness of the separator.

In the case of the sample No. C3 (the thickness of the separator was 8 μm), the low-temperature rate performance and the number of 50% maintained cycles were at the same level as those of the sample No. 5. However, in the heating test, there was a reduction in heat resistance, and a leakage failure was observed. This was because the insulation property, the pressure resistance and the heat resistance were reduced due to the small thickness of the separator.

TABLE 2A

| | Separator | | | | | | |
|---|---|---|---|---|---|---|---|
| Sample | $T_A$ (μm) | $T_B$ (μm) | $T_A/T_B$ | $T_A + T_B$ (μm) | Layer A Porosity (%) | Layer B Aramid content (wt %) | Air permeability (sec/100 mL) | Piercing strength (gf) |
| C3 | 6.5 | 1.5 | 4.3 | 8 | 42 | 33 | 150 | 180 |
| 5 | 8.9 | 2.1 | 4.3 | 11 | 42 | 33 | 210 | 240 |
| 2 | 13.0 | 3.0 | 4.3 | 16 | 42 | 33 | 300 | 350 |
| 6 | 17.8 | 4.2 | 4.3 | 22 | 42 | 33 | 410 | 480 |
| C4 | 18.7 | 4.3 | 4.3 | 23 | 42 | 33 | 430 | 500 |

TABLE 2B

| Sample | Low-temperature rate performance Capacity retention rate (%) | Cycle performance Number of 50% maintained cycles (cycles) | Heating test Maximum temperature (° C.) | Leakage failure (250 V applied) |
|---|---|---|---|---|
| C3 | 90 | 450 | 154 | Occurred |
| 5 | 89 | 460 | 148 | Nil |
| 2 | 87 | 450 | 145 | Nil |
| 6 | 82 | 410 | 143 | Nil |
| C4 | 72 | 340 | 142 | Nil |

As shown in Tables 2A and 2B, in the case where the ratio of the thickness of layer A relative to the thickness of layer B In the case of the sample No. C4 (the thickness of the separator was 23 μm), the results of the heating test and the leakage failure were at the same level as those of the sample No. 6. However, the low-temperature rate performance was reduced and the number of 50% maintained cycles was decreased. This was because the lithium ion permeability of the separator was reduced and the resistance was increased.

[Evaluation 3]

Table 3B shows evaluation results obtained when the thickness of the layer A and the thickness of the layer B were fixed, and the content of the aramid resin included in the layer B was varied, as shown in Table 3A.

TABLE 3A

| | Separator | | | | | | |
|---|---|---|---|---|---|---|---|
| Sample | $T_A$ (μm) | $T_B$ (μm) | $T_A/T_B$ | $T_A + T_B$ (μm) | Layer A Porosity (%) | Layer B Aramid content (wt %) | Air permeability (sec/100 mL) | Piercing strength (gf) |
| C5 | 13.0 | 3.0 | 4.3 | 16 | 42 | 16 | 200 | 350 |
| 7 | 13.0 | 3.0 | 4.3 | 16 | 42 | 20 | 230 | 350 |
| 2 | 13.0 | 3.0 | 4.3 | 16 | 42 | 33 | 300 | 350 |
| 8 | 13.0 | 3.0 | 4.3 | 16 | 42 | 45 | 350 | 350 |
| C6 | 13.0 | 3.0 | 4.3 | 16 | 42 | 50 | 400 | 350 |

TABLE 3B

| Sample | Low-temperature rate performance Capacity retention rate (%) | Cycle performance Number of 50% maintained cycles (cycles) | Heating test Maximum temperature (° C.) | Leakage failure (250 V applied) |
|---|---|---|---|---|
| C5 | 90 | 480 | 153 | Nil |
| 7 | 88 | 460 | 148 | Nil |
| 2 | 87 | 450 | 145 | Nil |
| 8 | 85 | 420 | 144 | Nil |
| C6 | 74 | 320 | 144 | Nil |

As shown in Tables 3A and 3B, in the samples Nos. 2, and 8 in which the ratio of the thickness of layer A relative to the thickness of layer B was 4.3, the thickness of the separator was 16 μm, and the content of aramid resin was 20 to 45 wt %, favorable results were obtained in terms of the low-temperature rate performance, the number of 50% maintained cycles, and the heating test. Moreover, no leakage failure was observed. However, the comparison among the samples Nos. 2, 7 and 8 revealed that there was a tendency that the low-temperature rate performance was slightly reduced and the number of 50% maintained cycles was slightly decreased in association with the increase in the content of aramid resin. This was because the lithium ion permeability in the layer B was reduced and the resistance was increased in association with the increase in the content of aramid resin.

In the case of the sample No. C5 (the content of aramid resin was 16 wt %), the low-temperature rate performance and the number of 50% maintained cycles were at the same level as those of the sample No. 7. However, in the heating test, an increase in the maximum temperature was observed. This was because the heat resistance of the layer B was reduced due to a small content of the aramid resin included in the layer B.

In the case of the sample No. C6 (the content of aramid resin was 50 wt %), the result of the heating test was at the same level as that of the sample No. 8, and no leakage failure was observed. However, the low-temperature rate performance was reduced and the number of 50% maintained cycles was also decreased. This was because the lithium ion permeability in the layer B was reduced, and the resistance was increased.

[Evaluation 4]

Table 4B shows evaluation results obtained when the thickness of the layer A and the thickness of the layer B were fixed, the content of the aramid resin included in the layer B was fixed, and the porosity of the layer A and the air permeability of the separator was varied, as shown in Table 4A.

TABLE 4B

| Sample | Low-temperature rate performance Capacity retention rate (%) | Cycle performance Number of 50% maintained cycles (cycles) | Heating test Maximum temperature (° C.) | Leakage failure (250 V applied) |
|---|---|---|---|---|
| C7 | 71 | 310 | 147 | Nil |
| 9 | 84 | 420 | 146 | Nil |
| 2 | 87 | 450 | 145 | Nil |
| 10 | 88 | 460 | 145 | Nil |
| C8 | 88 | 460 | 144 | Occurred |

As shown in Tables 4A and 4B, in the samples Nos. 2, and 10 in which the ratio of the thickness of layer A relative to the thickness of layer B was 4.3, the thickness of the separator was 16 μm, the content of the aramid resin included in the layer B was 33 wt %, and the porosity of the layer A was 37 to 48% (the air permeability of the separator was 150 sec/100 mL to 400 sec/100 mL), favorable results were obtained in terms of the low-temperature rate performance, the number of 50% maintained cycles, and the heating test. Moreover, no leakage failure was observed. However, the comparison among the samples Nos. 2, 9 and 10 revealed that there was a tendency that the low-temperature rate performance was slightly improved and the number of 50% maintained cycles was slightly increased in association with the increase in the porosity of the layer A (the decrease in the value of air permeability of the separator). This was because the lithium ion permeability in the layer A was increased and the resistance was reduced in association with the increase in the porosity of the layer A.

In the case of the sample No. C7 (the porosity of the layer A was 35%, and the air permeability of the separator was 450 sec/100 mL), the result of the heating test was at the same level as that of the sample No. 9, and no leakage failure was observed. However, the low-temperature rate performance was reduced and the number of 50% maintained cycles was decreased. This was because the lithium ion permeability in the layer A was reduced, and the resistance was increased.

In the case of the sample No. C8 (the porosity of the layer A was 50%, and the air permeability of the separator was 120 sec/100 mL), the low-temperature rate performance and the number of 50% maintained cycles were at the same level as those of the sample No. 10. However, a leakage failure was observed. This was because the insulation property and the pressure resistance were reduced due to the high porosity of the layer A.

[Evaluation 5]

Table 5B shows evaluation results obtained when the ratio of the thickness of layer A relative to the thickness of layer B

TABLE 4A

| | Separator | | | | | | |
|---|---|---|---|---|---|---|---|
| Sample | $T_A$ (μm) | $T_B$ (μm) | $T_A/T_B$ | $T_A+T_B$ (μm) | Layer A Porosity (%) | Layer B Aramid content (wt %) | Air permeability (sec/100 mL) | Piercing strength (gf) |
| C7 | 13.0 | 3.0 | 4.3 | 16 | 35 | 33 | 450 | 480 |
| 9 | 13.0 | 3.0 | 4.3 | 16 | 37 | 33 | 400 | 440 |
| 2 | 13.0 | 3.0 | 4.3 | 16 | 42 | 33 | 300 | 350 |
| 10 | 13.0 | 3.0 | 4.3 | 16 | 48 | 33 | 150 | 260 |
| C8 | 13.0 | 3.0 | 4.3 | 16 | 50 | 33 | 120 | 230 | was fixed, the content of the aramid resin included in the layer B was fixed, and the piercing strength of the separator was varied, as shown in Table 5A. The piercing strength was varied by controlling the roller temperature and the temperature in stretching in the fabrication of the layer A.

TABLE 5A

| | Separator | | | | | | |
|---|---|---|---|---|---|---|---|
| Sample | $T_A$ (μm) | $T_B$ (μm) | $T_A/T_B$ | $T_A+T_B$ (μm) | Layer A Porosity (%) | Layer B Aramid content (wt %) | Air permeability (sec/100 ml) | Piercing strength (gf) |
| C9 | 13.0 | 3.0 | 4.3 | 16 | 42 | 33 | 300 | 200 |
| 11 | 13.0 | 3.0 | 4.3 | 16 | 42 | 33 | 300 | 250 |
| 2  | 13.0 | 3.0 | 4.3 | 16 | 42 | 33 | 300 | 350 |
| 12 | 13.0 | 3.0 | 4.3 | 16 | 42 | 33 | 300 | 400 |
| 13 | 13.0 | 3.0 | 4.3 | 16 | 42 | 33 | 300 | 480 |

TABLE 5B

| Sample | Low-temperature rate performance Capacity retention rate (%) | Cycle performance Number of 50% maintained cycles (cycles) | Heating test Maximum temperature (° C.) | Leakage failure (250 V applied) |
|---|---|---|---|---|
| C9 | 89 | 440 | 147 | Occurred |
| 11 | 86 | 455 | 145 | Nil |
| 2  | 87 | 450 | 145 | Nil |
| 12 | 84 | 420 | 146 | Nil |
| 13 | 85 | 440 | 148 | Nil |

As shown in Tables 5A and 5B, in the samples Nos. 2, 11, 12 and 13 in which the ratio of the thickness of layer A relative to the thickness of layer B was 4.3, the thickness of the separator was 16 μm, the content of the aramid resin included in the layer B was 33 wt %, and the piercing strength of the separator was 250 gf or more, favorable results were obtained in terms of the low-temperature rate performance, the number of 50% maintained cycles, and the heating test. Moreover, no leakage failure was observed.

In the case of the sample No. C9 (the piercing strength of the separator was 200 gf), the low-temperature rate performance and the number of 50% maintained cycles were at the same level as those of the sample No. 11. However, a leakage failure was observed. This was because the insulation property and the pressure resistance of the separator were reduced.

In the foregoing Examples, although description is made about a prismatic non-aqueous electrolyte secondary battery including an electrode assembly in which electrodes are wound, the shape of the battery to which the present invention is applicable is not limited to a prismatic shape. For example, the present invention is applicable to cylindrical batteries, flat batteries, coin batteries, laminated batteries. In addition, in the foregoing Examples, although evaluations are carried out with respect to a battery for use in small-size equipment, the present invention is also effective for large-size, large-capacity batteries, such as batteries used as a power source for electric automobiles or in power storage apparatus.

Industrial Applicability

The present invention can be utilized in various non-aqueous electrolyte secondary batteries, and in particular, is useful in a non-aqueous electrolyte secondary battery for used in small-size equipment that are required to have an excellent output performance and safety. For example, the present invention is applicable to prismatic batteries, cylindrical batteries, flat batteries, coin batteries, laminated batteries, and the like. The present invention is also useful as a power source for electric automobiles, or in large-size power storage apparatus.

The invention claimed is:

1. A separator for use in a non-aqueous electrolyte secondary battery comprising a first porous layer (layer A) having a shutdown function which becomes substantially a non-porous layer at a high temperature, and a second porous layer (layer B) including an aramid resin and an inorganic material, said layer A and said layer B being laminated together, said inorganic material being immobilized in said layer B, wherein a ratio ($T_A/T_B$) of a thickness ($T_A$) of said layer A relative to a thickness ($T_B$) of said layer B is 2.5 or more and 13 or less, a total ($T_A+T_B$) of the thickness of said layer A and the thickness of said layer B is 11 μm or more and 22 μm or less, a content of said aramid resin included in said layer B is 20 wt % or more and 45 wt % or less, a content of said inorganic material included in said layer B is 120 parts by weight or more and 400 parts by weight or less, with respect to 100 parts by weight of said aramid resin a particle size of said inorganic material is 0.01 to 1 μm, and an air permeability is 150 sec/100 mL or more and 400 sec/10 mL or less.

2. The separator for use in a non-aqueous electrolyte secondary battery in accordance with claim 1, wherein said layer A is a porous layer comprising a thermoplastic resin which becomes substantially a non-porous layer at a temperature of 80° C or more and 180° C or less.

3. The separator for use in a non-aqueous electrolyte secondary battery in accordance with claim 1, wherein said layer A is a porous layer comprising polyethylene.

4. The separator for use in a non-aqueous electrolyte secondary battery in accordance with claim 1, wherein a porosity of said layer A is 37% or more and 48% or less.

5. The separator for use in a non-aqueous electrolyte secondary battery in accordance with of claim 1, wherein a piercing strength is 250 gf or more.

6. A non-aqueous electrolyte secondary battery comprising a positive electrode capable of reversibly absorbing and desorbing lithium ions, a negative electrode capable of reversibly absorbing and desorbing lithium ions, a separator interposed between said positive electrode and said negative electrode, and a non-aqueous electrolyte, wherein said separator is the separator for use in a non-aqueous electrolyte secondary battery in accordance with claim 1.

7. The separator for use in a non-aqueous electrolyte secondary battery in accordance with claim 1, wherein a total ($T_A+T_B$) of the thickness of said layer A and the thickness of said layer B is 14 μM or more and 22 μm or less.

* * * * *

UNITED STATES PATENT AND TRADEMARK OFFICE
CERTIFICATE OF CORRECTION

PATENT NO.      : 8,404,377 B2
APPLICATION NO. : 12/091666
DATED           : March 26, 2013
INVENTOR(S)     : Shinji Kasamatsu et al.

It is certified that error appears in the above-identified patent and that said Letters Patent is hereby corrected as shown below:

On the title page item (73), please change "Panasonic Corporation, Osaka (JP)" to
-- Panasonic Corporation, Osaka (JP) and Sumitomo Chemical Co., Ltd., Tokyo (JP) --.

Signed and Sealed this
Seventeenth Day of September, 2013

Teresa Stanek Rea
*Deputy Director of the United States Patent and Trademark Office*